(12) United States Patent
Gupta et al.

(10) Patent No.: US 8,549,560 B2
(45) Date of Patent: Oct. 1, 2013

(54) VIEWING AND PURCHASING PROGRAMMING IN OTHER FORMATS

(75) Inventors: Shekhar Gupta, Overland Park, KS (US); Michael Aaron Roberts, Overland Park, KS (US); Krishnakumar K. Bhaskarankutty Nair, Olathe, KS (US)

(73) Assignee: CenturyLink Intellectual Property LLC, Denver, CO (US)

( * ) Notice: Subject to any disclaimer, the term of this patent is extended or adjusted under 35 U.S.C. 154(b) by 241 days.

(21) Appl. No.: 12/423,490

(22) Filed: Apr. 14, 2009

(65) Prior Publication Data

US 2010/0263003 A1 Oct. 14, 2010

(51) Int. Cl.
*H04N 7/173* (2011.01)
*H04N 7/16* (2011.01)

(52) U.S. Cl.
USPC ............. 725/38; 725/1; 725/2; 725/3; 725/4; 725/5; 725/6; 725/7; 725/8; 725/37; 725/86; 725/87; 725/88; 725/89; 725/90; 725/100; 725/131; 725/139; 725/151

(58) Field of Classification Search
USPC ................ 725/1–8, 37–38, 86–90, 100, 131, 725/139, 151
See application file for complete search history.

(56) References Cited

U.S. PATENT DOCUMENTS

| 5,900,915 | A | 5/1999 | Morrison |
| 7,213,256 | B1 | 5/2007 | Kikinis |
| 2002/0133820 | A1* | 9/2002 | Arai et al. ...................... 725/39 |
| 2007/0101370 | A1* | 5/2007 | Calderwood ................... 725/47 |
| 2008/0141303 | A1* | 6/2008 | Walker et al. .................. 725/39 |
| 2008/0172704 | A1* | 7/2008 | Montazemi ................... 725/105 |
| 2009/0150958 | A1* | 6/2009 | Jerding et al. ................ 725/116 |
| 2010/0011117 | A1* | 1/2010 | Hristodorescu et al. ...... 709/231 |

* cited by examiner

*Primary Examiner* — Hunter B Lonsberry
*Assistant Examiner* — Yassin Alata
(74) *Attorney, Agent, or Firm* — Swanson & Bratschun, L.L.C.

(57) ABSTRACT

A method according to the present disclosure comprises displaying a program in a first format on a first television channel to a user and automatically displaying a message to the user indicating that the program is available in a second format on a second television channel. The message may be displayed on the first television channel while the program in the first format is being displayed. Additionally, the automatic displaying of the message may be unprompted by the user. In certain embodiments, the user may be provided the option to purchase the program in the second format if the second format is not within the user's subscription.

10 Claims, 12 Drawing Sheets

VIEWING AND PURCHASING PROGRAMMING IN OTHER FORMATS

TECHNICAL FIELD OF THE INVENTION

The present disclosure relates generally to television program viewing, and more particularly, to viewing and purchasing programming in other formats.

BACKGROUND OF THE INVENTION

As technology has developed, so have the ways in which viewers obtain video content. Besides pre-recorded video stored on physical mediums delivered to the consumer, viewers can watch video content by means of broadcast television programming, cable television, digital satellite television, or through a host of other transmission channels. With the development of Internet protocol television (IPTV), communication companies are establishing networks for subscribers to watch television programming. Generally, IPTV describes a system where a digital television service is delivered using Internet protocol (IP) over a network. The network used for IPTV may include the public Internet or a private IP network controlled by an IPTV service provider via a broadband connection known as digital subscriber lines (DSL).

In many instances, users may be viewing television programming in a first format on a television channel and be unaware of a provider's ability through IPTV to convert the program to a second, more preferred, format on the same television channel. For example, many networks provide both standard definition and high definition formats through IPTV. A viewer may be watching a program in standard definition and be unaware that the program is simultaneously being provided in high definition on another channel. Additionally, in other situations users may begin viewing a program after the program has already begun and therefore unable to view a segment of the programming.

Accordingly, there is a need for systems and methods for informing and providing viewers the ability to view and purchase programming in other formats.

SUMMARY OF THE INVENTION

In certain embodiments, a method comprises displaying a program in a first format on a first television channel to a user and automatically displaying a message to the user indicating that the program is available in a second format on a second television channel. The message may be displayed on the first television channel while the program in the first format is being displayed. Additionally, the automatic displaying of the message may be unprompted by the user.

In certain other embodiments, a method comprises displaying a program in a first format on a first television channel to a user and displaying a message to the user indicating that the program is available in a second format on a second television channel and providing the option to purchase the program in the second format on the second television channel. The method further includes receiving a selection from the user to purchase the program in the second format on the second television channel.

In even other embodiments, a method comprises displaying a program in a first format on a first television channel to a user through the use of a set top box operatively coupled to the user's television and displaying a message to the user providing the option to convert the program to a second format on the first television channel. The method includes receiving a selection from the user to convert the program to the second format on the first television channel. Additionally, the method includes converting the program to the second format on the first television channel in response to the user's selection.

In yet other embodiments, a method comprises displaying a program on a first television channel beginning at a first time and automatically displaying a message to the user indicating that the program will be available on a second television channel beginning at a second time different from the first time. The automatic displaying of the message is unprompted by the user.

DETAILED DESCRIPTION OF THE ILLUSTRATED EMBODIMENTS

Figure 1:
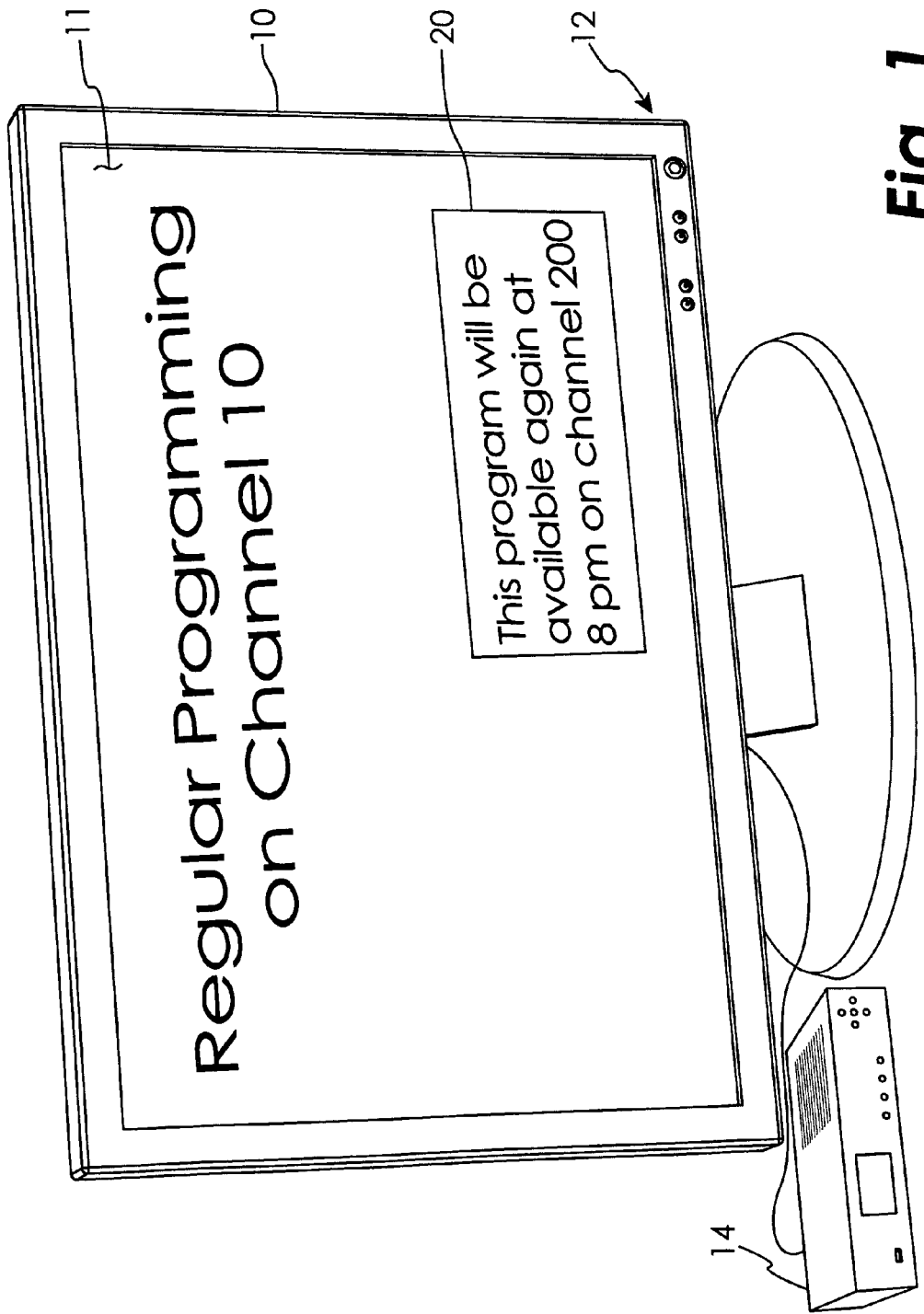
FIGS. 1-6 are perspective views of a television monitor providing various messages to a user according to embodiments of the present disclosure.

For the purposes of promoting an understanding of the principles of the invention, reference will now be made to the embodiment illustrated in the drawings and specific language will be used to describe the same. It will nevertheless be understood that no limitation of the scope of the invention is thereby intended, and alterations and modifications in the illustrated device, and further applications of the principles of the invention as illustrated therein are herein contemplated as would normally occur to one skilled in the art to which the invention relates.

The present disclosure is generally directed to systems and methods for viewing and purchasing programming in other formats. Additionally, the present disclosure is directed to systems and methods for providing messages to television viewers to relay programming information, such as the availability of a program for viewing on a different channel at a different time. In some embodiments, a program in a first format may be converted to a second format on the same television channel, if requested by a user. In other embodiments, a user may be viewing a program in a first format and informed of the availability of the program for viewing in a second format on a different channel. The television may be changed to the second channel to view the program in the second format, if requested by the user. In certain embodiments, the user's television programming subscription may not include programming in the second format, in which case the user may be given the option to purchase the programming in the second format.

As used herein, the terms "program" and/or "programming" are intended to broadly encompass any type of viewable and/or bearable data, information and/or video. The non-limiting example used herein is IPTV-provided television programming; however, it should be appreciated that the present disclosure is intended to cover any appropriate or available types of programs and/or programming, provided through any communications channel, such as cable television and digital satellite television, just to name two non-limiting examples. Additionally, the present disclosure discusses the example embodiment of viewing of programs on a television monitor, through a television set operably connected with a set top box. However, it is contemplated that the systems and methods discussed herein may be applicable to programming viewable on any type of appropriate device, such as a television without a set top bax, a satellite television receiver, a computer monitor, a hand held computer device, or a viewing monitor in a vehicle, to name a few non-limiting examples.

Further, as used herein, the term "format" is intended to broadly encompass any type or manner of program configuration, set-up and/or display. The particular example discussed with the present figures includes standard definition and high definition programming formats. Although standard definition and high definition formats are discussed, it should be appreciated that the presently-disclosed systems and methods are intended to cover other types of formats, such as two-dimensional programming and three-dimensional programming, as well as single-picture programming and picture-in-picture programming, to name a few non-limiting examples. Additionally, the terms "first" and "second" television channels simply refer to different channels occurring in any order. Similarly, the terms "first" and "second" formats simply refer to different programming formats.

FIGS. 1-6 illustrate an example television monitor which may be utilized in accordance with the presently-disclosed systems and methods. As shown, television monitor 10 is a flat screen television monitor having a viewing screen 11 and a plurality of control buttons 12. In the particular illustrated embodiment, television monitor 10 is operably connected to a set top box 14 which provides cable television programming to the television monitor. In certain embodiments, the set top box is operable to communicate with a middleware server operated by the television programming provider as part of a video services network. In certain embodiments, the middleware server is provided with specialized software to provide the capability and functionality contemplated by the present disclosure. In such embodiments, the software on the middleware server may be operable to monitor all programming information communicated to the various set top boxes in communication with the server. The middleware server may provide programming information to the set top box on a continuous basis or as programming information changes or is updated by the provider. It should be appreciated that the detailed operations of the middleware server and/or the set top box will not be discussed herein as they are not critical to the present disclosure. It is contemplated that the functionality discussed herein may be provided by the set top box, the middleware server, a combination of the set top box and the middleware server, or another appropriate device or system that would occur to one of ordinary skill in the art.

It should be appreciated that the representations of the television monitor 10 and the set top box 14 are for illustrative purposes and are not intended to be detailed depictions showing all the components of such devices. Additionally, the devices are represented in simplified form for ease of understanding. Accordingly, the television monitor 10 and/or the set top box 14 may be arranged, designed and/or configured in a variety of other appropriate manners as would occur to one of ordinary skill in the art, including being integrated into a single unit.

FIGS. 1-6 depict automatic, unprompted messages which may be presented to a user viewing a television program in a first format on a first television channel, labeled "Regular Programming on Channel 10" in the figures, on the television monitor 10. Although the messages are depicted as occurring in the lower right hand corner of the viewing screen 11, it should be appreciated that the messages may be sized and positioned differently as would occur to one of ordinary skill in the art. The various example messages illustrated in FIGS. 1-6 will be briefly discussed herein, with additional discussion of the presently-disclosed systems and methods occurring with respect to the flowcharts shown in FIGS. 7-13.

With respect to the particular embodiment shown in FIG. 1, the presently-disclosed system is operable to display a message 20 on the screen 11 to inform the viewer that the particular program being displayed will be available on a different channel at a different time in the future. In this way, the user may find the next-available viewing time to be more convenient and may choose to forego viewing the particular program being displayed and instead view the program at the later point in time on the different channel. In the particular illustrated embodiment, for example, the message 20 informs the user that the particular program being displayed on channel 10 will again be available for viewing on channel 200 at 8 pm.

Figure 2:
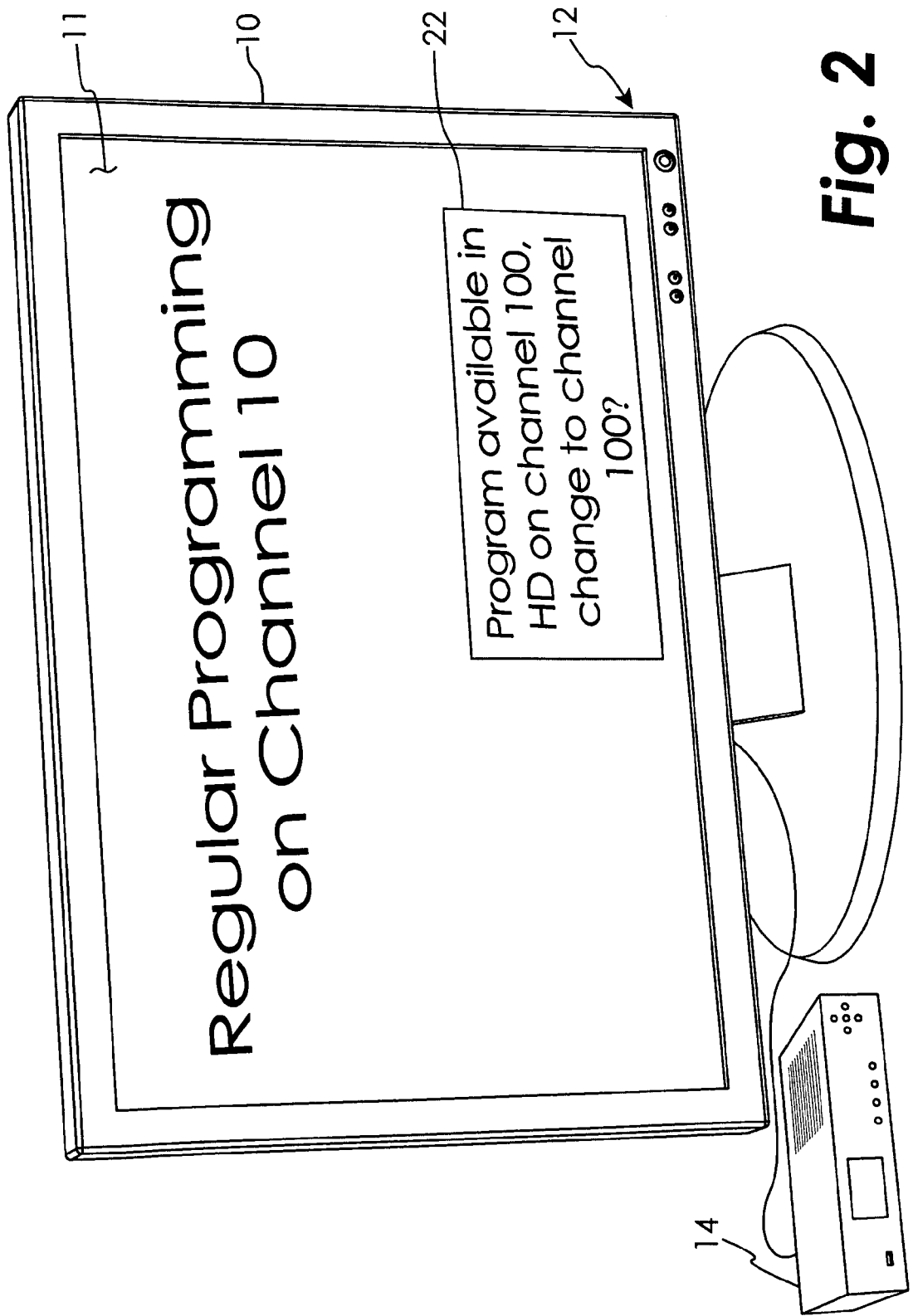

FIG. 2 shows a message 22 being displayed on the screen 11 to inform the viewer that the particular program currently being displayed in standard definition format is available for viewing in high definition format ("HD") on a different channel. As illustrated in FIG. 2, the message may include an option to change the displayed channel to the high definition channel. If the user chooses to change to the high definition channel, the system may be configured to automatically change to the high definition channel upon the user's selection. In other embodiments, the message may provide the information regarding the availability of the program in high definition format on a different channel without providing the option to automatically change to the high definition channel. In such embodiments, the user may change to the high definition channel if desired and at the user's discretion.

In certain embodiments, the user's television programming subscription may not include high definition programming services. In such cases, the system may display a message 24 (shown in FIG. 3) informing that the user does not currently subscribe to the high definition channel and providing the option to purchase the high definition channel. The high definition channel may be purchased for a limited time for viewing the particular program or may be added to the user's subscription package for unlimited viewing.

Figure 4:
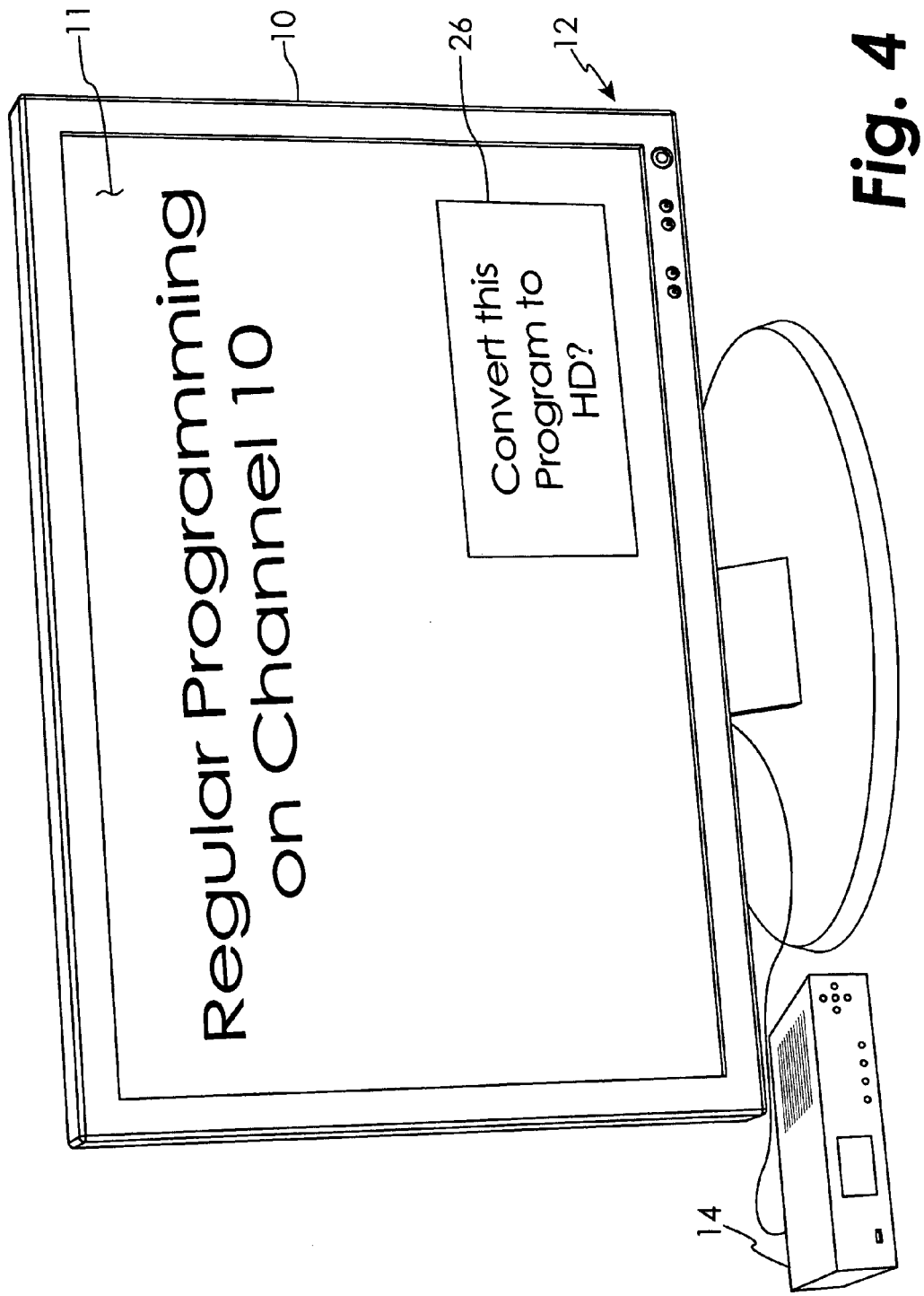
Figure 5:
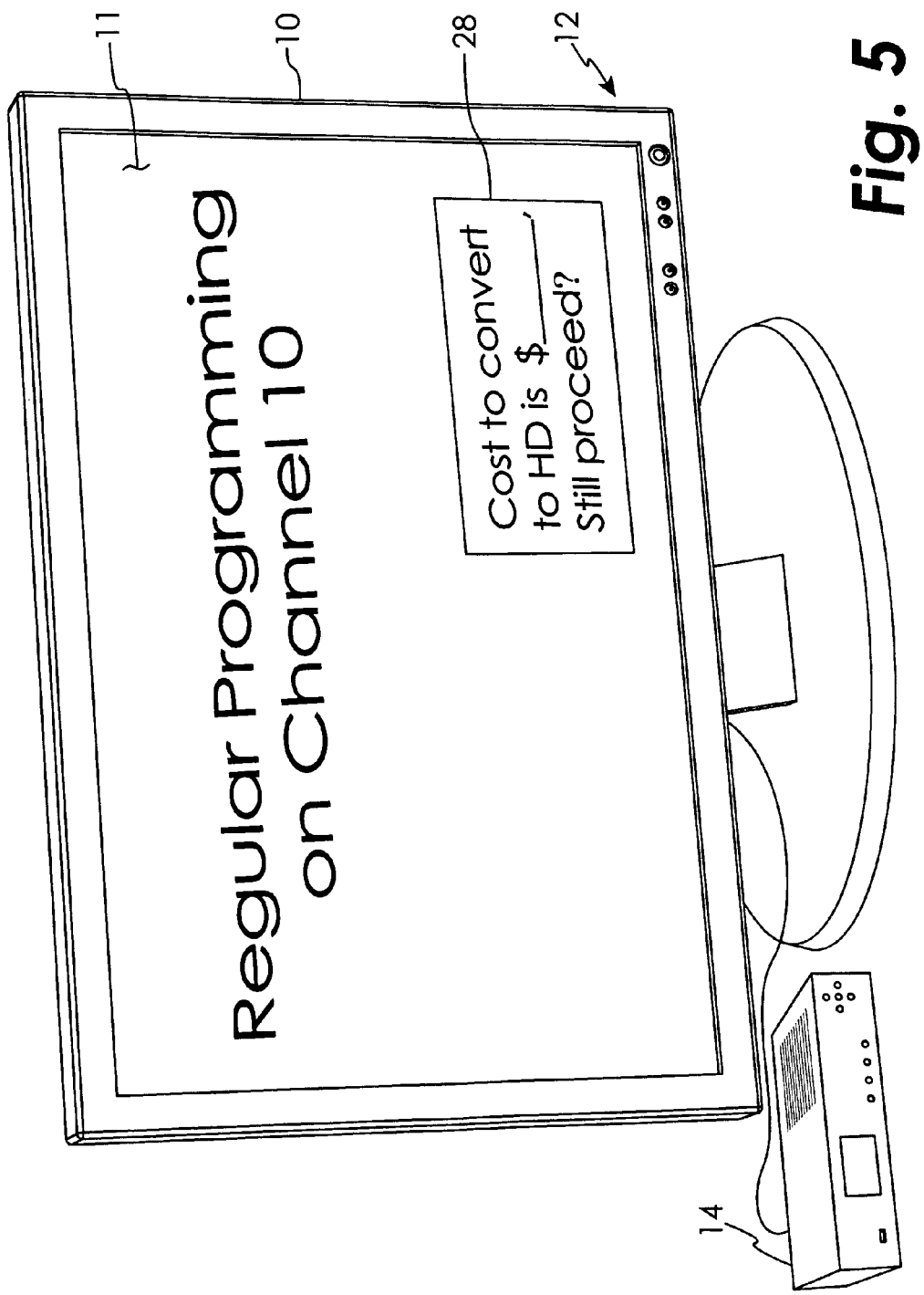

With respect to FIGS. 4 and 5, in other embodiments the presently-disclosed system may be operable to convert programming in a first format to a second format while remaining on the same programming channel, such as converting standard definition programming to high definition programming as in the illustrated example. FIG. 4 shows a message 26 displayed on screen 11 to inform the viewer that the program being displayed in standard definition format may be converted to high definition format. The message 26 provides the option for such conversion. If the user chooses to convert the program to HD, the conversion may occur in a variety of appropriate manners as would occur to one of ordinary skill in the art. As one example, the system may be configured to provide additional picture elements or pixels to the television channel to convert the program. The additional picture elements may be provided by the set top box 14, by the middleware server in communication with the set top box, or by another appropriate device as would occur to one of ordinary skill in the art. It should be appreciated that other appropriate conversion methods as would occur to one of ordinary skill in the art are contemplated by the present disclosure.

As mentioned above, in certain embodiments the user's television programming subscription may not include high definition programming. In such cases, the system may display a message 28 (shown in FIG. 5) informing that the user of the cost to convert to high definition programming and inquiring if the user would still like to make the conversion. The high definition conversion may be purchased for a limited time for viewing the particular program or may be added to the user's subscription package for unlimited viewing on the converted channel and optionally other high definition channels.

Figure 6:
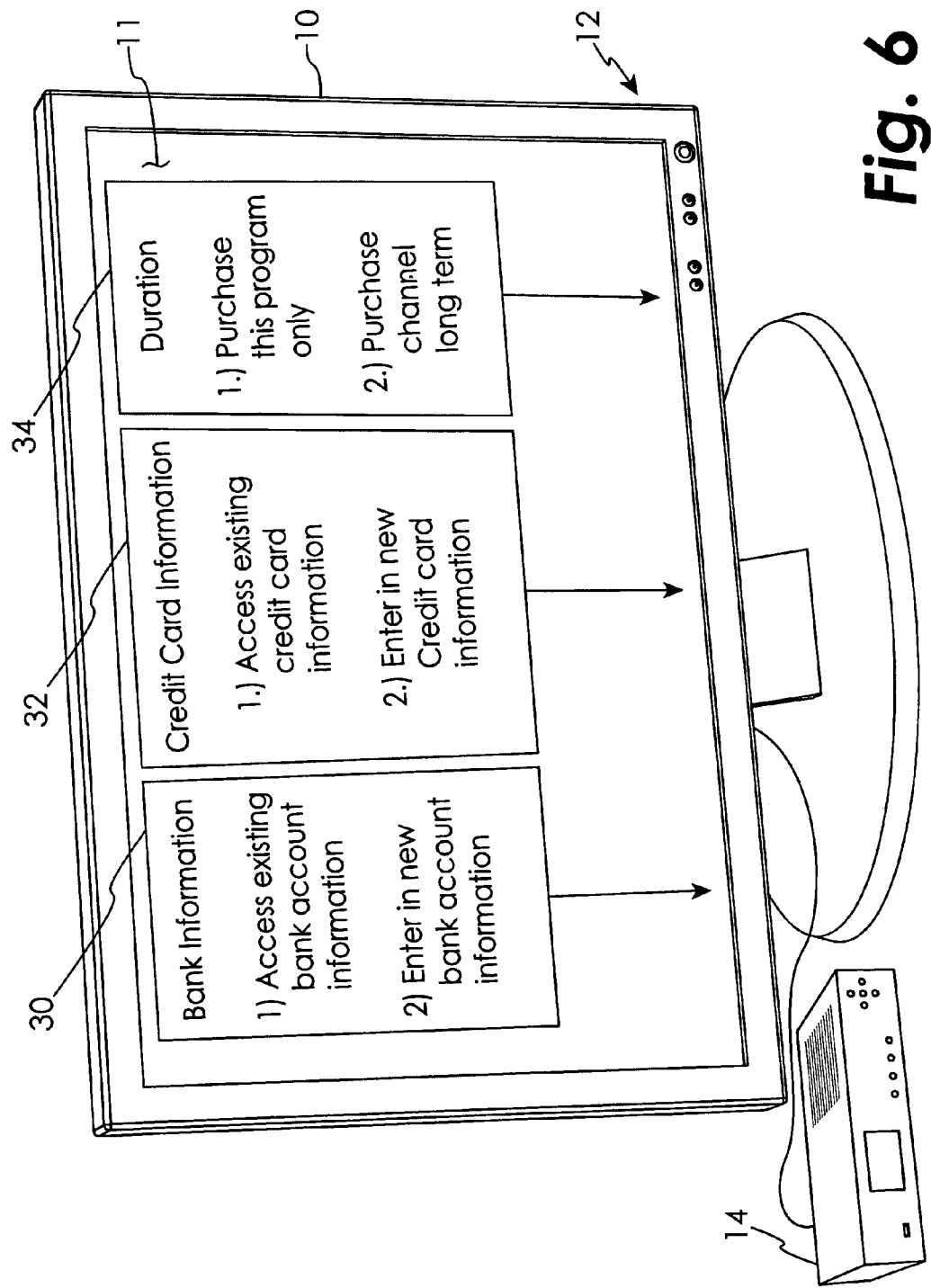

In embodiments in which the user does not currently subscribe to the second format and would like to purchase programming in the second format, a variety of appropriate mechanisms and procedures may be employed to accomplish such purchasing. FIG. 6 illustrates non-limiting examples of the numerous possible payment mechanisms that may be used to receive and process payment from the viewer. The particular illustrated and optional messages shown in FIG. 6 include a bank information message 30, a credit card information message 32, and a duration message 34. Regarding both the bank information message 30 and the credit card information message 32, the viewer has the option of accessing existing information stored within the system or entering in new information to purchase the programming. In certain embodiments, a data input device may be operably connected with the set top box to enable the user to enter in the necessary payment information. To name a few non-limiting examples, the data input device may be an alphanumeric keyboard, a touch screen device, a handwriting recognition device and/or a voice recognition device. Additionally, in certain embodiments, the system may be operable to store the payment information entered in by the user so that the information may be accessed in the future as desired. With respect to message 34, the user may have the option of purchasing the high definition channel or conversion on a limited basis, such as solely for the particular program being displayed, or purchasing the high definition channel or conversion on an extended long-term basis. Certain other embodiments may include various combinations of the optional messages or other appropriate messages to facilitate the retrieval and processing of payment information as would occur to one of ordinary skill in the art.

Figure 7:
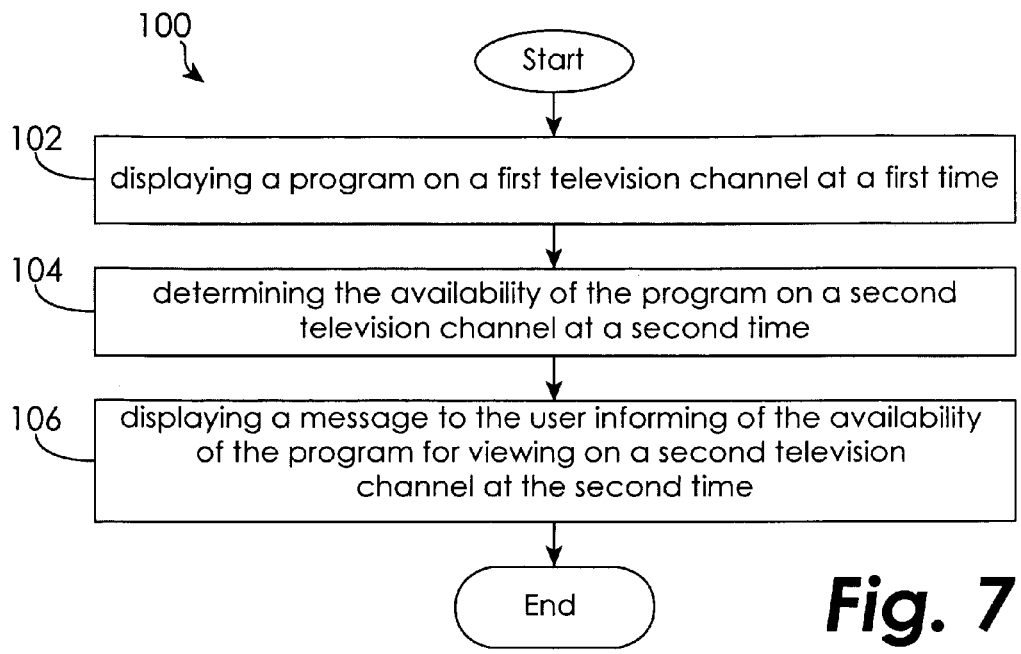
FIGS. 7-13 are flowcharts describing methods of viewing and purchasing programming in other formats according to embodiments of the present disclosure.
Figure 8:
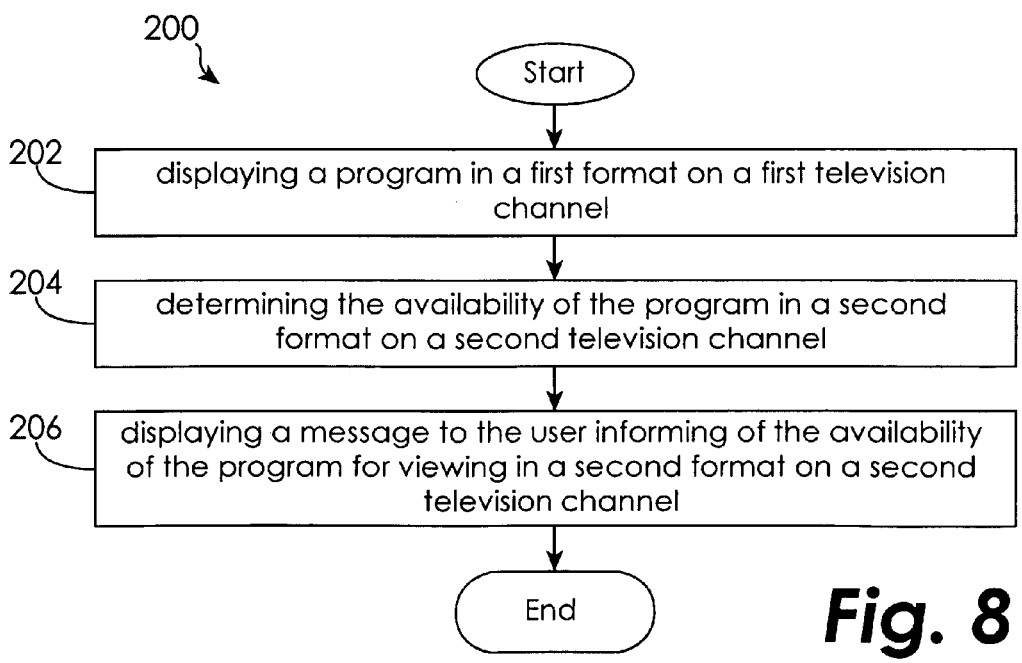
Figure 9:
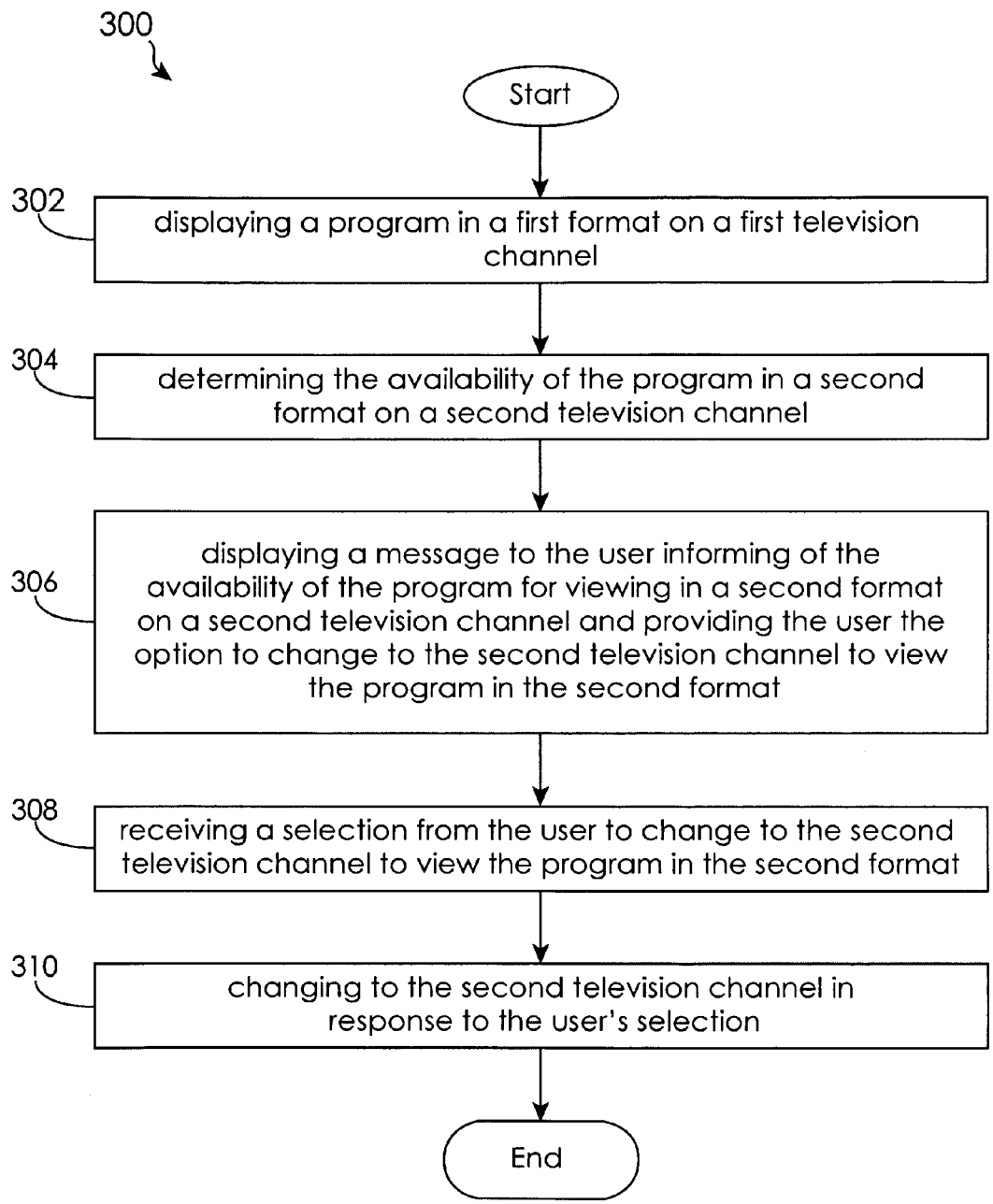
Figure 10:
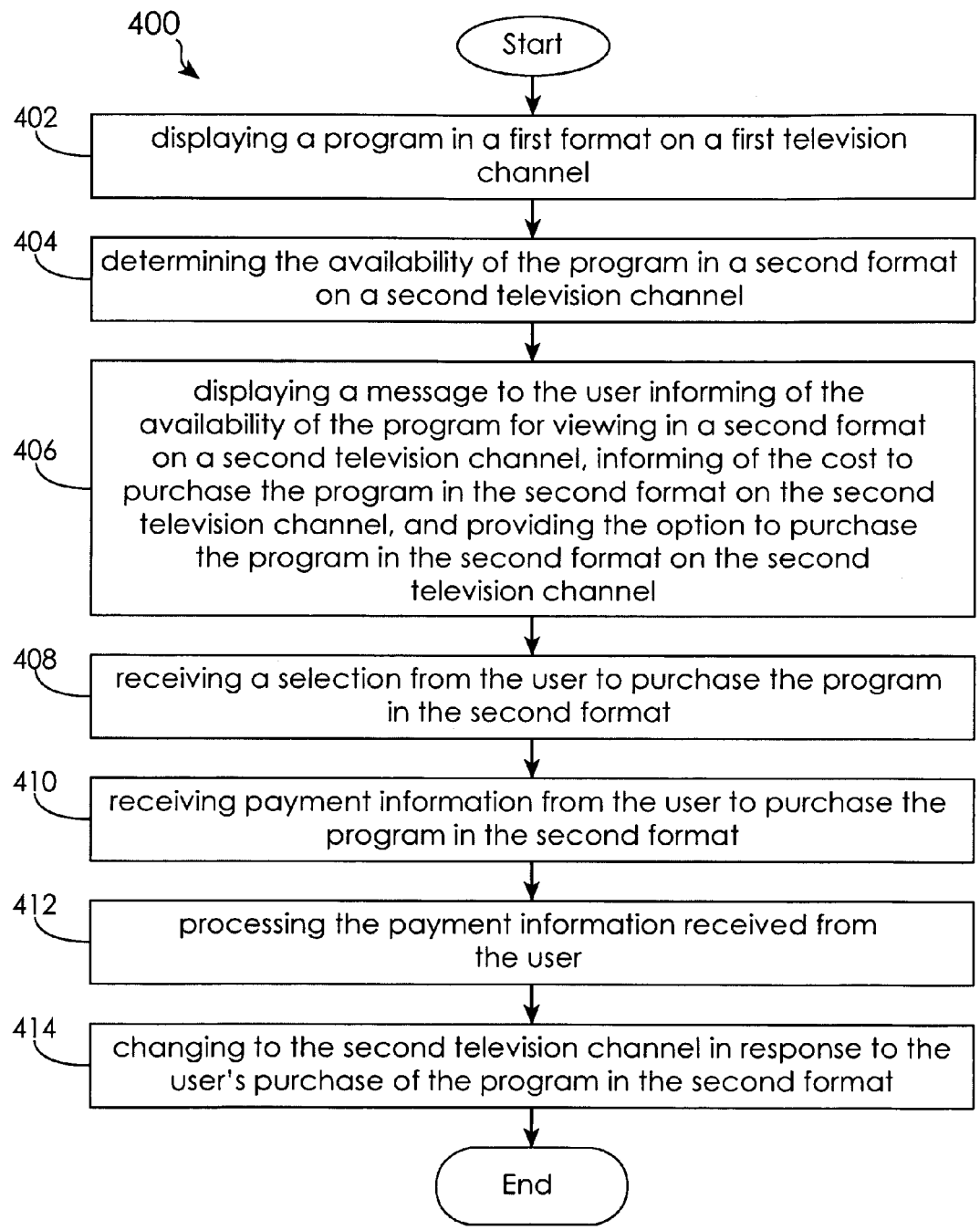
Figure 11:
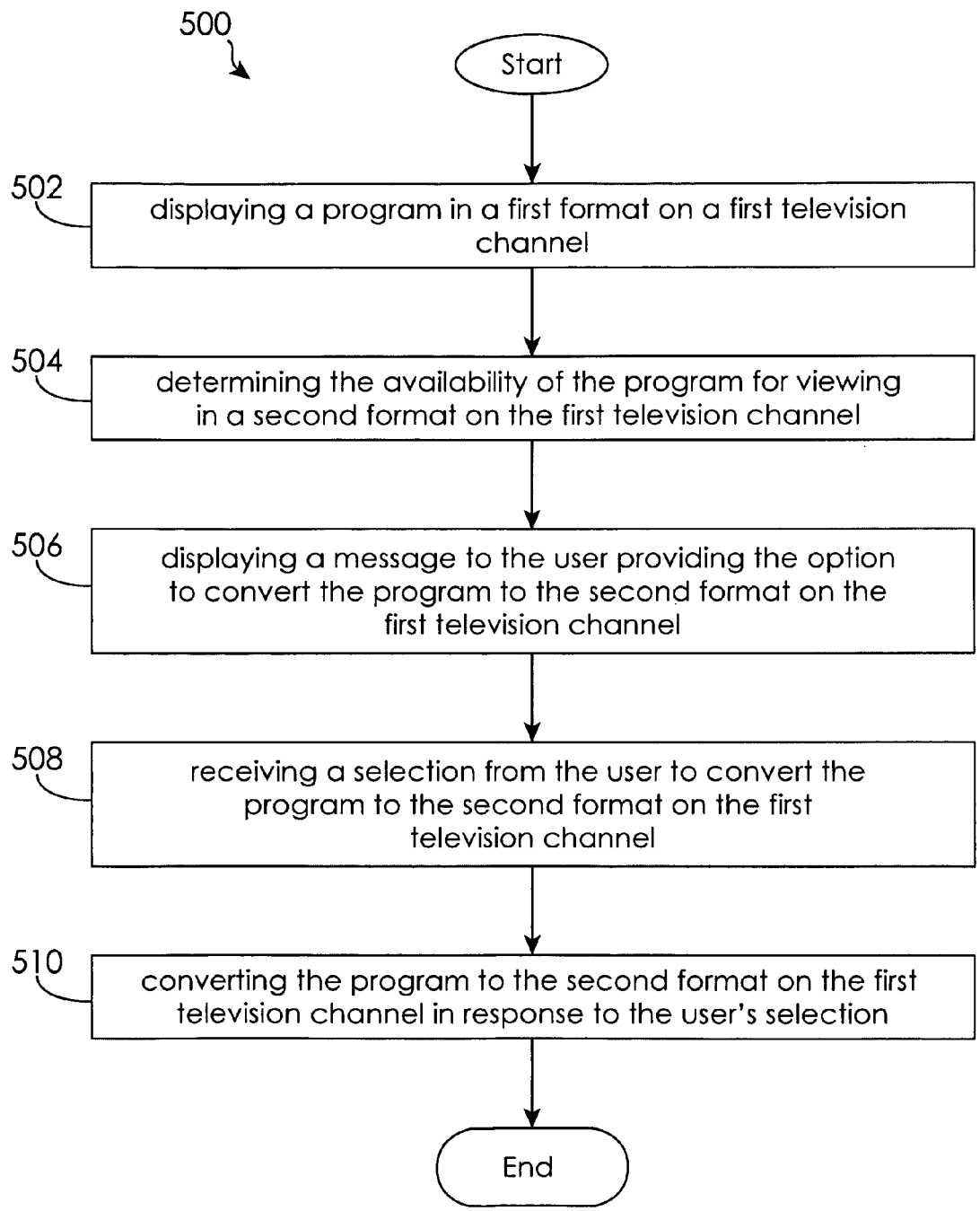
Figure 12:
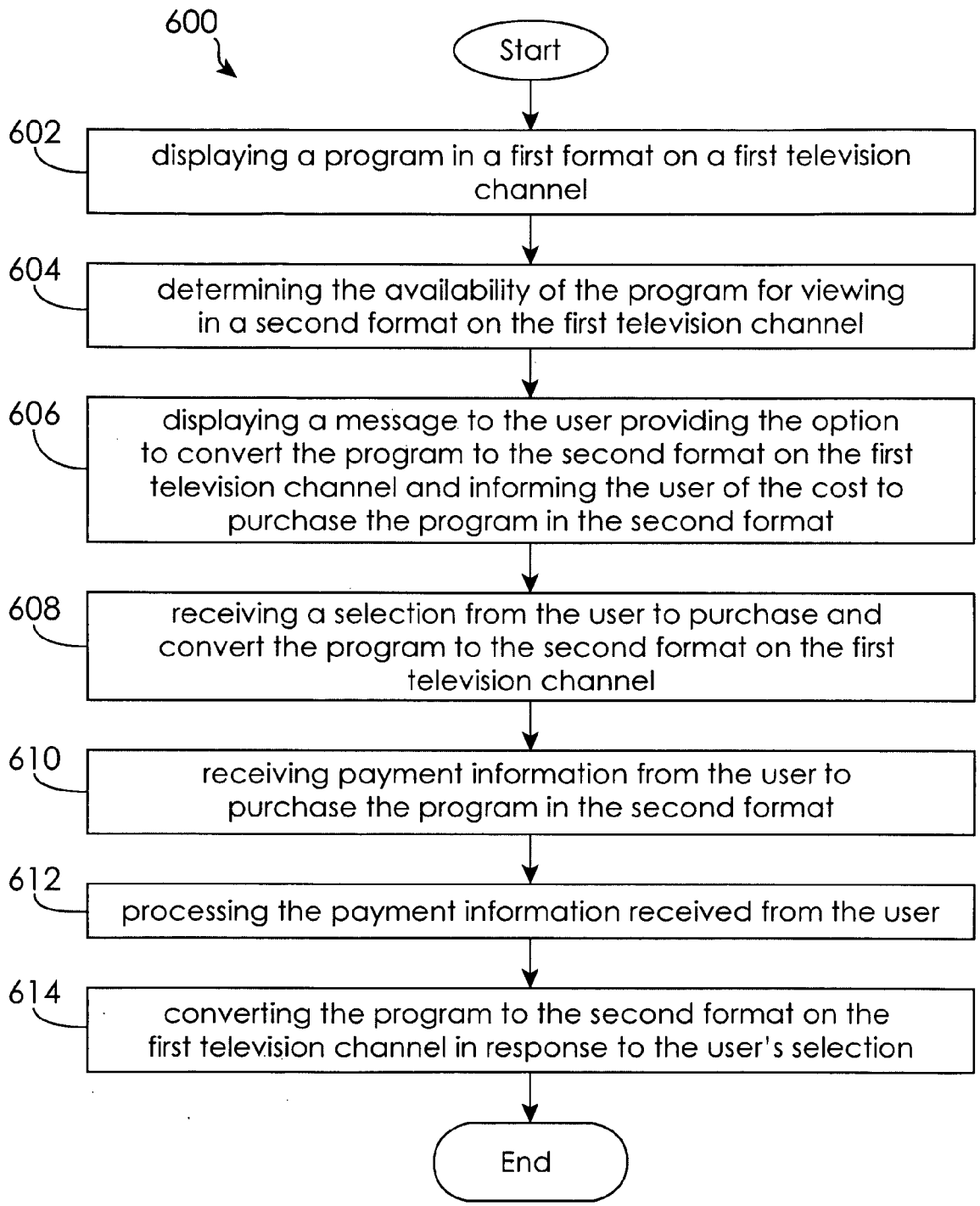
Figure 13:
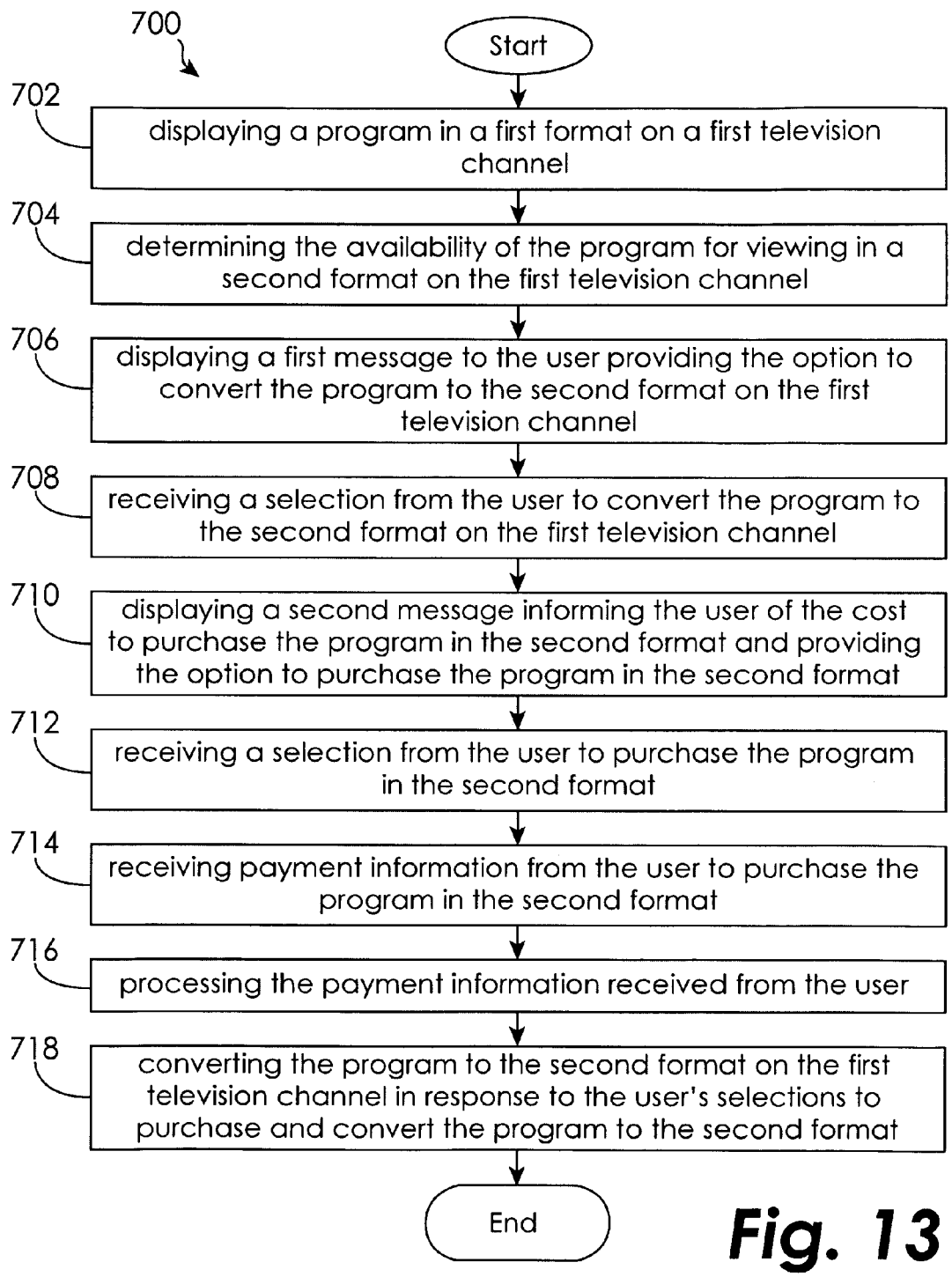

FIGS. 7-13 are flowcharts representing various example methods of viewing and purchasing programming in other formats according to the present disclosure. More specifically, the flow chart shown in FIG. 7 provides an example method in which the user is informed of program availability on a different channel at a different time. The flow charts shown in FIGS. 8-10 represent example situations in which information about programming in a second format on a second television channel is made available to the viewer. Additionally, the flowcharts shown in FIGS. 11-13 represent example situations in which programming in a first format may be converted to a second format. It should be appreciated that the timing and/or order of the steps in the flowcharts can be varied as would occur to one of ordinary skill in the art. Additionally, many of the flowcharts include the same or similar steps as other flow charts. Accordingly, such repeated steps will not be discussed again with respect to the methods in later-occurring flowcharts for the sake of brevity. Additionally, it should be appreciated that the functionality contemplated by many of the steps can occur at the set top box, the middleware server in communication with the set top box, or another appropriate system device as would occur to one of ordinary skill in the art.

The example method 100 shown in FIG. 7 begins with displaying a program on a first television channel at step 102. At step 104, the system may be operable to determine the availability of the program on a second television channel, different from the first television channel, at a later time. Additionally, the system may be operable to display a message to the user, at step 106, informing of the availability of viewing the program on the second television channel at the later time. Message 20 shown in FIG. 1 is just one non-limiting example of the type of message that may be displayed at step 106. In this way, a viewer watching a program can be informed of when the program will be available again for viewing, even if on a different television channel.

The example method 200 shown in FIG. 8 begins with displaying a program in a first format, such as standard definition for example, on a first television channel at step 202. At step 204, the system may be operable to determine the availability of the program in a second format, such as high definition for example, on a second television channel. A message may be displayed to the user at step 206 informing the user of such program availability. If desired, the user may change to the second television channel to view the program in the second format at the user's discretion.

The example method 300 shown in FIG. 9 also begins with displaying a program in a first format, such as standard definition for example, on a first television channel at step 302. At step 304, similar to step 204, the system may be operable to determine the availability of the program in a second format, such as high definition for example, on a second television channel. At step 306, the system may be operable to display a message to the user informing of the availability of the program in the second format on the second channel and further providing the user the option to change to the second television channel to view the program in the second format. Message 22 shown in FIG. 2 is just one non-limiting example of the type of message that may be displayed at step 306. If the user chooses to change to the second television channel at step 308, the system may be operable to change the channel at step 310 in response to the user's selection at step 308. To illustrate an example, a viewer watching a program in standard definition may be informed of the availability of that same program in high definition on a different channel and given the option to switch to the high definition program.

Figure 3:
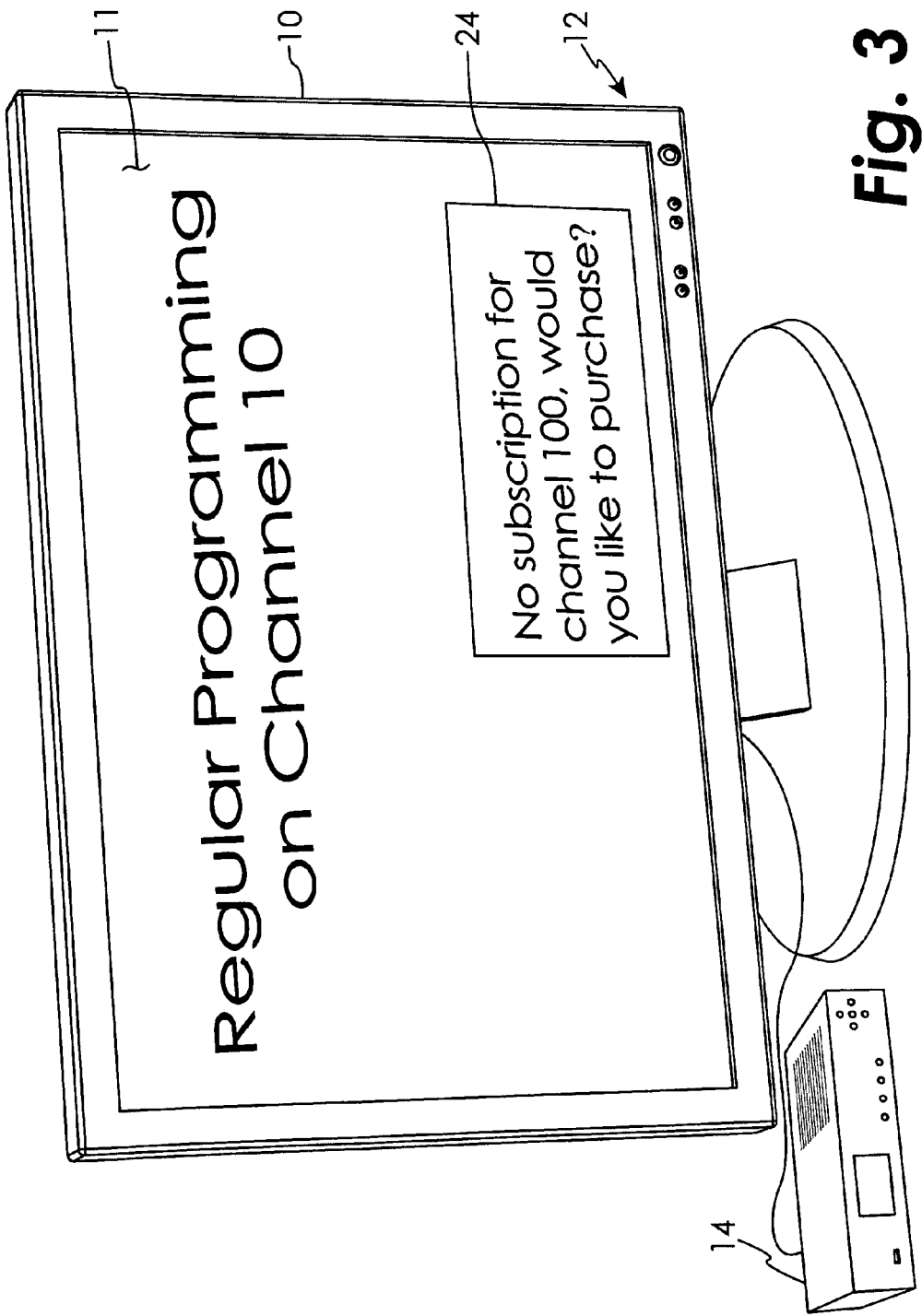

The example method 400 shown in FIG. 10 also begins with displaying a program in a first format, such as standard definition for example, on a first television channel at step 402. At step 404, similar to steps 204 and 304, the system may be operable to determine the availability of the program in a second format, such as high definition for example, on a second television channel. However, in certain embodiments, the user may not currently subscribe to the second television channel. Example method 400 is directed to such embodiments. At step 406, the system may be operable to display a message to the user informing of the availability of the program in the second format on the second channel, the cost to purchase the program in the second format, and providing the user the option to make the purchase. One or both of messages 22 and/or 24 shown in FIGS. 2 and 3 are non-limiting examples of the type of message(s) that may be displayed at step 406. It should be appreciated that the information conveyed at step 406 may be embodied in a single display message or multiple messages as would occur to one of ordinary skill in the art.

At steps 408, the user chooses to purchase the program in the second format and provides the payment information to accomplish the purchase at step 410. The receipt of payment information from the user may optionally be initiated by one or more messages requesting payment, including one or more of messages 30, 32 and 34 shown in FIG. 6. As mentioned above, in certain embodiments, the user may use new or existing bank or credit card information to make the purchase. Additionally, the user may choose to purchase the particular program only or may add the second television channel to the user's subscription for an extended period of time. The manner in which the payment information is received (at step 410)

and processed (at step 412) is not critical to the present disclosure. In response to the user's selection to purchase the second television channel, the system may optionally be operable to change to the second television channel at step 414 so that the program in the second format may be viewed.

FIGS. 11-13 illustrate flowcharts representing example situations in which programming in a first format may be converted to a second format on the same television channel. Similar to the other methods described above, the example method 500 shown in FIG. 11 begins with displaying a program in a first format, such as standard definition for example, on a first television channel at step 502. At step 504, the system may be operable to determine the availability of the user's television and/or the set top box to convert the program to a second format, such as high definition for example, on the same first television channel. If the second format programming is available, at step 506 the system may be operable to display a message to the user providing the option to convert the program to the second format on the first television channel. Message 26 shown in FIG. 4 is just one non-limiting example of the type of message that may be displayed at step 506. If the user chooses to convert the program at step 508, the system converts the program to the second format on the first television channel at step 510 in response to the user's selection at step 508. As mentioned above, the conversion may occur in a variety of appropriate manners as would occur to one of ordinary skill in the art, including the addition of additional picture elements to the television channel as one example.

The example methods 600 and 700 shown in FIGS. 12 and 13, respectively, are similar to example method 500 discussed above. Methods 600 and 700 are directed to embodiments in which the user may not currently subscribe to programming in the second format and must purchase the conversion. As will be discussed in greater detail below, methods 600 and 700 differ in the manner in which the information is conveyed to the user. Additionally, methods 600 and 700 includes steps 602, 604 and 614, and 702, 704 and 718, similar to steps 502, 504 and 510 from method 500 shown in FIG. 11, respectively, the discussion of which will not be repeated for the sake of brevity.

At step 606 in method 600, the system may display a message to the user providing the option to covert the program to the second format and informing the user of the cost to purchase the program in the second format. In certain embodiments, the user may choose to make the purchase and convert the program to the second format at step 608. At step 610, the system receives payment information from the user to purchase the program in the second format and processes the payment information at step 612. As mentioned above with respect to FIG. 6, a variety of appropriate mechanisms and procedures may be employed to accomplish the purchasing. FIG. 6 illustrates optional messages 30, 32 and 34 which may optionally be used to facilitate the retrieval and processing of payment information from the user.

Turning to method 700, at step 706, the system may display a first message to the providing the option to covert the program to the second format and display a second message to the user at step 710 informing the user of the cost to purchase the program in the second format and providing the option to purchase the program in the second format. Following step 706, if the user chooses to convert the program to the second format, the system will receive a selection from the user at step 708 to convert the program. In certain embodiments, the receipt of the user's selection at step 708 will prompt the system to display the second message at step 710. Message 28 shown in FIG. 5 is just one non-limiting example of the type of message that may be displayed at step 710. Following step 710, if the user chooses to purchase the program in the second format, the system will receive a selection from the user at step 712. Steps 714 and 716 are directed to the same or similar payment retrieval and processing mechanisms as steps 610 and 612 discussed with respect to example method 600 and thus the discussion of such steps will not be repeated for the sake of brevity. Following step 716, the system may be operable to convert the program to the second format on the first television channel at step 718.

As mentioned above, the different formats of programming contemplated by the present disclosure may include single-picture programming and multiple-picture programming, such as picture-in-picture programming, in certain embodiments. If picture-in-picture programming is selected, the system may request that the user designate the channels to be included in the picture-in-picture programming. In other embodiments, the system may select the channels according to protocol occurring on the system, such as the most frequently viewed channels by the user, to name one non-limiting example. In certain embodiments, the set top box gathers the designated channel information and communicates such information to the middleware server. The middleware server then transmits the designated channels to the set top box in an appropriate format, such as cascading form as an example. Upon receiving the channels from the middleware server in the appropriate format, the set top box is operable to display the channels as picture-in-picture programming on the television channel. In this way, the picture-in-picture functionality is at least partially transferred to the middleware server such that all televisions that the middleware server is in communication with (via set top boxes) are capable of hosting picture-in-picture programming.

Additionally, it is also contemplated that the systems and methods disclosed herein may be operable to provide program de-selection options and functionality to the user. In certain embodiments, a user may choose to view, purchase and/or convert to a program in a second format and at a later time desire to de-select the program in the second format and return to the program in its original format. In such embodiments, the system may provide an option to the user to de-select the programming in the second format. If the user chooses to de-select programming, in certain embodiments the set top box may communicate the de-selection to the middleware server and request the program in the original format. It should be appreciated that a variety of appropriate de-selection methods may be used as would occur to one of ordinary skill in the art.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:
1. A set top box, configured to:
    display, with a television in communication with the set top box, a program in a two-dimensional format on a first television channel to a user, in accordance with a subscription package to which the user subscribes;
    determine that the program will be available at a later time;
    display a message to the user indicating that the program will be available at the later time;

receive, from a middleware server in an IPTV video services network in communication with the set top box, an indication that the program is available in a three-dimensional format;
determine an availability of the television for the three-dimensional format;
display a message to the user providing the option to convert the program to a the three-dimensional format on the first television channel;
if the subscription package does not include three-dimensional programming, display a message to the user informing the user of a cost to convert the program to the three-dimensional format;
receive a selection from the user to convert the program to the three-dimensional format on the first television channel;
convert the program to the three-dimensional format on the first television channel in response to the user's selection, wherein converting includes providing, by a middleware server, additional picture elements to the set top box;
provide an option to the user to de-select the programming in the three-dimensional format and return to the two-dimensional format;
receive a de-selection from the user to convert the program to the two-dimensional format on the first television channel; and
convert the program to the two-dimensional format on the first television channel in response to the user's de-selection.

2. The set top box of claim 1, wherein the set top box is further configured to:
receive a selection from the user to purchase the conversion on the first television channel.

3. A method, comprising:
displaying, with a television in communication with a set top box, a program in a two-dimensional format on a first television channel to a user, in accordance with a subscription package to which a user subscribes;
determining that the program will be available at a later time;
displaying a message to the user indicating that the program will be available at the later time;
determining, at a middleware server in an IPTV video services network in communication with the set top box, that the program is available in a three-dimensional format;
determining an availability of the television for the three-dimensional format;
displaying a message to the user indicating that the program is available in the three-dimensional format and providing the option to purchase the conversion of the program to the three-dimensional format on the first television channel;
receiving a selection from the user to purchase the conversion of the program to the second format on the first television channel;
if the subscription package does not include three-dimensional programming, displaying a message to the user informing the user of a cost to convert the program to the three-dimensional format;
providing, in response to receiving the user selection to purchase the conversion, additional picture elements by a middleware server to the set top box;
providing an option to the user to de-select the programming in the three-dimensional format and return to the two-dimensional format;
receiving a de-selection from the user to convert the program to the two-dimensional format on the first television channel; and
converting the program to the two-dimensional format on the first television channel in response to the user's de-selection.

4. The method of claim 3, further comprising processing payment information received from the user to purchase the conversion of the program to the three-dimensional format on the first television channel.

5. The method of claim 3, further comprising providing the set top box operatively coupled to a user's television, wherein the set top box is operably connected with the IPTV video services network having the middleware server, the middleware server providing programming information to the set top box and the set top box providing the program to the user.

6. The method of claim 5, wherein the middleware server provides programming information to the set top box as changes in programming occur.

7. The method of claim 5, wherein the middleware server provides programming information to the set top box on a continuous basis.

8. A method, comprising:
displaying a program in a two-dimensional format on a first television channel to a user through the use of a set top box operatively coupled to the user's television and to an IPTV video services network, in accordance with a subscription package to which a user subscribes;
determining that the program will be available at a later time;
displaying a message to the user indicating that the program will be available at the later time;
determining, at a middleware server in the IPTV video services network, that the program is available in a three-dimensional format;
determining an availability of the television for the three-dimensional format;
displaying a message to the user providing the option to convert the program to the three-dimensional format on the first television channel;
if the subscription package does not include three-dimensional programming, displaying a message to the user informing the user of a cost to convert the program to the three-dimensional format;
receiving a selection from the user to convert the program to the three-dimensional format on the first television channel;
converting the program to the three-dimensional format on the first television channel in response to the user's selection, wherein converting includes providing, by a middleware server, additional picture elements to the set top box;
providing an option to the user to de-select the programming in the three-dimensional format and return to the two-dimensional format;
receiving a de-selection from the user to convert the program to the two-dimensional format on the first television channel; and
converting the program to the two-dimensional format on the first television channel in response to the user's de-selection.

9. The method of claim 8, further comprising:
receiving a selection from the user to purchase the program in the three-dimensional format.

10. A system, comprising:
a middleware server, in an IPTV video services network, configured to determine that a program is available in a three dimensional format and provide additional picture elements for converting the program from a two-dimensional format to the three-dimensional format; and a set top box, configured to:
  display, with a television in communication with the set top box, a program in the two-dimensional format on a first television channel to a user, in accordance with a subscription package to which the user subscribes;
  determine that the program will be available at a later time;
  display a message to the user indicating that the program will be available at the later time;
  receive, from the middleware server in the IPTV video services network in communication with the set top box, an indication that the program is available in the three-dimensional format;
  determine an availability of the television for the three-dimensional format;
  display a message to the user providing the option to convert the program to the three-dimensional format on the first television channel;
  if the subscription package does not include three-dimensional programming, display a message to the user informing the user of a cost to convert the program to the three-dimensional format;
  receive a selection from the user to convert the program to the three-dimensional format on the first television channel;
  convert the program to the three-dimensional format on the first television channel in response to the user's selection, wherein converting includes receiving, from the middleware server, additional picture elements to convert the program from the two-dimensional format to the three-dimensional format;
  provide an option to the user to de-select the programming in the three-dimensional format and return to the two-dimensional format;
  receive a de-selection from the user to convert the program to the two-dimensional format on the first television channel; and
  convert the program to the two-dimensional format on the first television channel in response to the user's de-selection.

* * * * *